United States Patent Office 3,244,757
Patented Apr. 5, 1966

3,244,757
CONVERSION OF ALKYL SUBSTITUTED AROMATIC HYDROCARBONS TO ALKENYL SUBSTITUTED CYCLOALKANES
Herman S. Bloch, Skokie, Ill., assignor to Universal Oil Products Company, Des Plaines, Ill., a corporation of Delaware
No Drawing. Filed Apr. 30, 1963, Ser. No. 277,003
7 Claims. (Cl. 260—666)

This invention relates in general to the conversion of alkyl substituted aromatic hydrocarbons to alkenyl substituted cycloalkanes. More particularly, the present invention relates to the conversion of an alkyl substituted benzene to an alkenyl substituted cyclohexane. The alkenyl substituted cycloalkanes prepared pursuant to the process of this invention contain an olefinic bond at the carbon atom adjacent to the ring and are hereinafter referred to as alpha-alkenylcycloalkanes to so designate the point of unsaturation.

Certain of the alkenyl substituted cycloalkanes and particularly the alpha-alkenylcyclohexanes such as vinylcyclohexane, divinylcyclohexane, trivinylcyclohexane, and the like, are useful as chemical intermediates and raw materials for a variety of organic preparations. For example, vinylcyclohexane has assumed considerable importance as a polymerizable raw material in the manufacture of improved plastic products. Alkylbenzenes, such as ethylbenzene, are abundantly available as starting materials in the preparation of alpha alkenylcyclohexanes such as vinylcyclohexane. However, in the conversion of alkylbenzenes to alkenylcyclohexanes by conventional methods, for example, hydrogenation of the alkylbenzene followed by selective dehydrogenation, the reaction product contains a substantial amount of alkenylcyclohexenes, such as vinylcyclohexene, as by-products.

It is an object of this invention to provide a process for the preparation of an alkenyl substituted cycloalkane. It is a more specific object to present a process for the conversion of an alkyl substituted aromatic hydrocarbon to the corresponding alkenyl substituted cycloalkane. It is a more specific object to provide a process for the conversion of an alkyl substituted benzene to the corresponding alpha-alkenylcyclohexane to the substantial exclusion of alkenylcyclohexene by-products.

In one of its broad aspects this invention embodies a process for the conversion of an alkyl substituted aromatic hydrocarbon to the corresponding alkenyl substituted cycloalkane which comprises oxidizing said aromatic hydrocarbon at hydroperoxidation reaction conditions and forming an alpha hydroperoxy derivative thereof, hydrogenating the alpha hydroperoxy derivative at hydrogenation reaction conditions and forming a cycloalkyl carbinol, dehydrating the cycloalkyl carbinol at dehydration reaction conditions and forming an alpha-alkenylcycloalkane.

One of the specific embodiments of the present invention relates to a process for the preparation of vinylcyclohexane and comprises heating ethylbenzene at a temperature of from about 75° C. to about 135° C. in contact with air and sodium ethylbenzene hydroperoxide and forming ethylbenzene hydroperoxide, heating said ethylbenzene hydroperoxide at a temperature of from about 25° C. to about 200° C. in contact with hydrogen and nickel-kieselguhr and forming cyclohexylmethyl carbinol, heating said cyclohexylmethyl carbinol at a temperature of from about 125° C. to about 200° C. in contact with iodine and forming the desired vinylcyclohexane. Other embodiments and further objects of the present invention will become apparent in the following detailed description of the process of this invention.

The aromatic hydrocarbons which can be utilized as starting materials in this process may comprise a benzene nucleus or condensed benzene nuclei containing at least one alkyl group of up to about 20 carbon atoms substituted thereon, the carbon atom of said alkyl group alpha to the aromatic nucleu being an oxidizable secondary or tertiary carbon atom. Suitable alkyl substituted aromatic hydrocarbons thus include alkyl substituted benzenes such as ethylbenzene, 1,2-diethylbenzene, 1,3-diethylbenzene, 1,4-diethylbenzene, 1,3-diethyl-5-methylbenzene, 1,2,4-triethylbenzene, 1,3,5-triethylbenzene, 1-ethyl-4-methylbenzene, cumene, p-cymene, 1-ethyl-4-isopropylbenzene, 1-ethyl-3-isopropylbenzene, sec-butylbenzene, butylbenzene, propylbenzene, isobutylbenzene, isoamylbenzene, etc., and also alkyl substituted polynuclear hydrocarbons such as 1-ethylnaphthalene, 2-ethylnaphthalene, 9-ethylanthracene, 1-ethylphenanthrene, 7-isopropyl-1-methylphenanthrene, and the like.

Formation of an alpha hydroperoxy derivative of the above-described alkyl substituted aromatic hydrocarbons in the first step of the present process may be effected under hydroperoxidation reaction conditions heretofore disclosed in the art. For example, molecular oxygen, or other oxygen-containing gas such as air, is contacted with said aromatic hydrocarbon in the presence of a hydroperoxidation promoter at conditions under which at least a substantial part of the aromatic hydrocarbon is in the liquid phase. Suitable oxidation temperatures lie in the range of from about 50° C. to about 150° C., and generally not exceeding the boiling temperature of the hydrocarbon being treated, for example 136° C. in the case of ethylbenzene. In general, it is preferred to utilize a temperature in excess of about 75° C., for example, from about 75° C. to about 135° C., the specific temperature in any particular case being in part dependent upon the aromatic hydrocarbon being treated and in part dependent upon the other operating conditions employed. Suitable hydroperoxidation promoters include the hydroperoxide of the aromatic hydrocarbon being treated, more usually an alkali metal salt thereof such as sodium ethylbenzene hydroperoxide and the like. Other compounds capable of forming free radicals at reaction conditions can be utilized, including azo compounds such as azobis-isobutyronitrile, as well as organic peroxy compounds like di-t-butyl peroxide, acetyl peroxide, benzoyl peroxide, etc. Under the conditions used, the carbon atom alpha to the aromatic nucleus is selectively oxidized.

The hydroperoxy derivative formed in the first step of the process is recovered from the unreacted starting materials and hydrogenated under mild hydrogenation reaction conditions to form a cycloalkyl carbinol. Any of the hydrogenation catalysts known to the art may be employed without regard to selectivity. However, utilization of acidic supporting materials which promote dehydration as a side reaction is to be avoided. Kieselguhr containing up to about 60 wt. percent nickel deposited as nickle oxide and subsequently reduced is particularly suitable. Other suitable hydrogenation catalysts are those consisting of, or comprising, such metals as iron, nickel, cobalt, platinum, palladium, copper, chromium, molybdenum, tungsten, etc., or catalytically active compounds thereof, especially the oxides and sulfides, for example, nickel oxide, copper oxide in combination with chromium oxide, molybdenum sulfide in combination with tungsten sulfide, etc. The catalytic materials can be utilized as a colloidal dispersion in the hydroperoxide derivative or supported on an inert or catalytically active carrier material, for example, kieselguhr, activated carbon, and the like.

Hydrogenation can be carried out at a temperature in the range of from about 25° C. to about 200° C. and at a hydrogen pressure of from about 50 to about 5000 pounds per square inch. It is preferred to utilize a temperature in the lower range, say from about 25° C. to about 100° C. to obviate formation of undesirable by-products resulting from thermal decomposition of the hydroperoxide being treated. On substantially complete reduction of the hydroperoxy group, a temperature of up to about 200° C. may be employed to complete the reduction of the hydroperoxide and form a cycloalkyl carbinol.

Reduction of the alpha hydroperoxy derivative of the alkyl substituted aromatic hydrocarbon starting material, as above described, results in the formation of a cycloalkyl carbinol, for example, the hydroperoxy derivative of ethylbenzene is reduced to cyclohexylmethyl carbinol. The desired alpha alkenylcycloalkane, corresponding to the alkyl substituted aromatic hydrocarbon starting material, is derived from said carbinol by dehydration of the same at dehydration reaction conditions. Dehydration reaction conditions comprise heating of the carbinol in contact with a suitable catalyst at a temperature of from about 50° C. to about 350° C., and preferably at a temperature of from about 125° C. to about 200° C. Suitable dehydration catalysts include certain of the metal oxides, for example alumina, silica, magnesia, zirconia, thoria, etc., or a combination thereof such as silica-alumina, or the naturally occurring kaolin, bentonite, montmorillonite, and the like, wherein the acidic properties of said metal oxides have been substantially neutralized, preferably by modification with the oxide or hydroxide of a metal of Groups I and II of the Periodic Table. Thus the metal oxide dehydration catalyst may be modified with the oxide of lithium, sodium, potassium, rubidium, cesium, beryllium, magnesium, calcium, strontium, barium, etc. The metal oxide dehydration catalyst may be modified by the metal compound of Groups I and II by compositing said metal compound with the metal oxide by any convenient or conventional method. The catalyst is generally utilized in a pelleted form, although this particular shape is not essential to the process of this invention, and may be so formed either prior to modification with the metal oxide of Groups I and II, or subsequent thereto. One preferred method of catalyst preparation comprises forming the metal oxide into pellets and immersing said pellets into an aqueous solution of a soluble compound of a metal of Groups I and II, for example, the nitrate or acetate, the concentration of said compound in said solution being such as to insure a deposit of from about 0.05 wt. percent to about 2.5 wt. percent of a Group I and Group II metal ion on the metal oxide. The pellets are thereafter dried and calcined.

Iodine is also a desirable dehydration reaction catalyst and may be utilized as a homogeneous catalyst comprising from about 0.005 wt. percent to about 0.1 wt. percent of the dehydration reaction mixture. While larger quantities are operable, no particular benefit results by reason thereof.

The following examples are presented in illustration of the specific embodiments of this invention. It is not intended that said examples be construed as an undue limitation on the generally broad scope of this invention as set out in the appended claims.

*Example I*

In the preparation of vinylcyclohexane from ethylbenzene, air is bubbled through a suspension of 5 grams of sodium cumene hydroperoxide in about 425 grams of ethylbenzene at a temperature of 120–130° C. The reaction mixture is examined periodically by gas-liquid chromatography methods. When approximately 20% of the ethylbenzene has been converted to the hydroperoxide the reaction mixture is cooled, filtered, and the bulk of the unreacted ethylbenzene separated therefrom by vacuum distillation. The distillation bottoms comprising about 110 grams of ethylbenzene hydroperoxide are sealed in an 850 cc. rotating autoclave with about 5 grams of nickel kieselguhr catalyst and 25 atmospheres of hydrogen charged thereto. The autoclave is heated initially for a 1 hour period at a temperature of about 50° C. and thereafter at 100° C. for a 1 hour period. The autoclave is then cooled, vented to the atmosphere, and the liquid contents decanted from the catalyst. The hydrogenated material, comprising cyclohexylmethyl carbinol, is heated with about 3 grams of iodine crystals at reflux conditions until water of dehydration is no longer formed, the dehydration material is cooled and vinylcyclohexane, together with small amounts of ethylcyclohexene, is recovered therefrom.

*Example II*

In the conversion of 1,4-diethylbenzene to 1,4-divinylcyclohexane, air is bubbled through a suspension of 5 grams of sodium cumene hydroperoxide in about 535 grams of the 1,4-diethylbenzene at a temperature of 120–130° C. When approximately 25% of the diethylbenzene has been converted to hydroperoxide, the reaction mixture is cooled, filtered, and unreacted diethylbenzene together with monohydroperoxide are separated therefrom by vacuum distillation. The distillation bottoms, comprising about 80 grams of diethylbenzene dihydroperoxide are sealed in an 850 cc. rotating autoclave together with about 5 grams of nickel kieselguhr catalyst, and 25 atmospheres of hydrogen is charged thereto. The autoclave is heated initially for a 1 hour period at a temperature of about 50° C. and thereafter at 100° C. for a 1 hour period. The autoclave is thereafter cooled, vented to the atmosphere, and the liquid contents are decanted from the catalyst. The hydrogenated material comprising alpha,alpha'-dihydroxy-1,4-diethylcyclohexane, is heated with about 2 grams of iodine crystals at reflux conditions and water of dehydration is recovered overhead. When the water of dehydration is no longer formed, the dehydrated material is cooled and 1,4-divinylcyclohexane, together with small amounts of diethylcyclohexadiene and ethylvinylcyclohexane, is recovered therefrom.

*Example III*

In the preparation of 1-cyclohexylpropene from propylbenzene, about 880 grams of the propylbenzene, containing about 10 grams of sodium cumene hydroperoxide admixed therewith, is heated at 120–130° C. and air is bubbled therethrough until about a 30% conversion of the propylbenzene to the hydroperoxide has been attained. The reaction mixture is cooled and filtered, and unreacted propylbenzene distilled therefrom. The hydroperoxide oxidation product is charged to an 850 cc. rotating autoclave together with 5 grams of nickel kieselguhr catalyst and sealed therein under 25 atmospheres of hydrogen. The reaction mixture is heated to about 50° C. for 1 hour and thereafter at about 100° C. until hydrogen is no longer absorbed in the reaction. The autoclave is thereafter cooled, vented to the atmosphere, and the liquid contents decanted from the catalyst. The decanted material, comprising cyclohexylethyl carbinal is refluxed with about 5 grams of iodine crystals and the water of dehydration is recovered overhead. The dehydrated material comprises the aforesaid 1-cyclohexylpropene together with small amounts of propylcyclohexene.

Example IV

In the preparation of 2-cyclohexylpropene from cumene, about 880 grams of the cumene, containing about 10 grams of sodium cumene hydroperoxide admixed therewith, is heated at 120–130° C. and air is bubbled therethrough until about a 30% conversion of the cumene to the hydroperoxide has been attained. The reaction mixture is cooled and filtered, and unreacted cumene distilled therefrom. The hydroperoxidation oxidation product is charged to an 850 cc. rotating autoclave together with about 5 grams of nickel kieselguhr catalyst and sealed therein under 25 atmospheres of hydrogen. The reaction mixture is heated at a temperature of 50° C. for a 1 hour period and thereafter at about 100° C. until hydrogen is no longer absorbed by the reaction mixture. The autoclave is thereafter cooled, vented to the atmosphere, and the liquid contents decanted from the catalyst. The decanted material, comprising 2-cyclohexyl-2-propanol, is refluxed with about 5 grams of iodine and water of dehydration recovered overhead. The dehydration product comprises the desired 2-cyclohexylpropene.

Example V

In the preparation of 2-vinyldecahydronaphthalene from 2-ethylnaphthalene, about 1056 grams of the ethylnaphthalene, containing about 10 grams of sodium cumene hydroperoxide admixed therewith, is heated at 120–130° C. and air is bubbled therethrough until about a 30% conversion of the ethylnaphthalene to the hydroperoxide has been attained. The reaction mixture is cooled and filtered, and unreacted ethylnaphthalene distilled therefrom. The hydroperoxide oxidation product is charged to an 850 cc. rotating autoclave together with 5 grams of nickel kieselguhr catalyst and sealed therein under 25 atmospheres of hydrogen. The reaction mixture is heated at 50° C. for 1 hour and thereafter at about 100° C. until hydrogen is no longer absorbed by the reaction. The autoclave is thereafter cooled, vented to the atmosphere, and the liquid contents decanted from the catalyst. The decanted material, comprising naphthylmethyl carbinol, is refluxed with about 5 grams of iodine and water of dehydration is recovered overhead. The dehydrated product comprises the desired 2-vinyldecahydronaphthalene.

The process of this invention may also be carried out in a continuous manner. For example, ethylbenzene, admixed with a suitable hydroperoxidation promoter, is continuously charged to a reactor maintained at the prescribed temperature. The ethylbenzene is charged through the reactor in admixture with air introduced countercurrent to the ethylbenzene flow or concurrently therewith. The reactor effluent comprising the hydroperoxide oxidation product, is withdrawn from the reactor at a rate which will insure up to about a 30% conversion of the ethylbenzene. The reactor effluent is filtered and distilled to separate unreacted ethylbenzene therefrom and said ethylbenzene is recycled as a portion of the starting material. Hydrogen and the residual reactor effluent comprising the hydroperoxide oxidation product are charged to a second reactor in a mole ratio of about 10:1, said reactor being maintained at proper operating conditions of temperature and pressure and containing a hydrogenation catalyst disposed therein. The aforesaid residual reactor effluent may be charged to the reactor at a liquid hourly space velocity of from about 0.5 to about 10. The reaction mixture is continuously withdrawn from said second reactor and passed over a bed of dehydration catalyst such as deacidified activated alumina at a temperature of about 250° C. The effluent is condensed and the water of dehydration separated and continuously removed from the vinylcyclohexane, which is recovered as the upper phase of the separator.

I claim as my invention:

1. A process for the conversion of an alkyl substituted aromatic hydrocarbon, having an alkyl group of from 2 to about 20 carbon atoms and containing a hydrogen substituent on the alpha carbon atom, to the corresponding alkenyl substituted cycloalkane which comprises oxidizing said aromatic hydrocarbon at a hydroperoxidation temperature of from about 50° C. to about 150° C. and forming an alpha hydroperoxy derivative thereof, hydrogenating the alpha hydroperoxy derivative at a hydrogenation temperature of from about 25° C. to about 200° C. and forming a cycloalkyl carbinol, dehydrating the cycloalkyl carbinol at a dehydration temperature of from about 50° C. to about 350° C. and forming the desired alpha alkenyl cyclohexane.

2. A process for the conversion of an alkyl substituted benzene having an alkyl group of from 2 to about 20 carbon atoms and containing a hydrogen substituent on the alpha carbon atom to the corresponding alkenyl substituted cyclohexane which comprises oxidizing said alkylbenzene at a hydroperoxidation temperature of from about 50° C. to about 150° C. and forming an alpha hydroperoxy derivative thereof, hydrogenating the alpha hydroperoxy derivative at a hydrogenation temperature of from about 25° C. to about 200° C. and forming a cyclohexyl carbinol, dehydrating the cyclohexyl carbinol at a dehydration temperature of from about 50° C. to about 350° C. and forming the desired alpha alkenylcyclohexane.

3. A process for the conversion of ethylbenzene to vinylcyclohexane which comprises heating said ethylbenzene at a temperature of from about 75° C. to about 135° C. in contact with air and sodium ethylbenzene hydroperoxide and forming ethylbenzene hydroperoxide, heating said ethylbenzene hydroperoxide at a temperature of from about 25° C. to about 200° C. in contact with hydrogen and a nickel kieselguhr catalyst and forming cyclohexylmethyl carbinol, heating said cyclohexylmethyl carbinol at a temperature of from about 125° C. to about 200° C. in contact with iodine and forming vinylcyclohexane.

4. A process for the conversion of 1,4-diethylbenzene to 1,4-divinylcyclohexane which comprises heating said diethylbenzene at a temperature of from about 75° C. to about 135° C. in contact with air and sodium diethylbenzene hydroperoxide and forming diethylbenzene dihydroperoxide, heating said diethylbenzene dihydroperoxide at a temperature of from about 25° C. to about 200° C. in contact with hydrogen and nickel kieselguhr catalyst and forming alpha, alpha'-dihydroxy-1,4-diethylcyclohexane, heating said alpha, alpha'-dihydroxy-1,4-diethylcyclohexane at a temperature of from about 125° C. to about 200° C. in contact with iodine and forming 1,4-divinylcyclohexane.

5. A process for the conversion of propylbenzene to 1-cyclohexylpropene which comprises heating said propylbenzene at a temperature of from about 75° C. to about 135° C. in contact with air and sodium propylbenzene hydroperoxide and forming propylbenzene hydroperoxide, heating said propylbenzene hyproperoxide at a temperature of from about 25° C. to about 200° C. in contact with hydrogen and nickel kieselguhr catalyst and forming cyclohexylethyl carbinol, heating said cyclohexylethyl carbinol at a temperature of from about 125° C. to about 200° C. in contact with iodine and forming 1-cyclohexylpropene.

6. A process for the conversion of cumene to 2-cyclohexylpropene which comprises heating said cumene at a temperature of from about 75° C. to about 135° C. in contact with air and sodium cumene hydroperoxide and forming cumene hydroperoxide, heating said cumene hydroperoxide at a temperature of from about 25° C. to about 200° C. in contact with hydrogen and nickel kieselguhr catalyst and forming 2-cyclohexyl-2-propanol, heating said 2-cyclohexyl-2-2-propanol at a temperature of from about 125° C. to about 200° C. in contact with iodine and forming 2-cyclohexylpropene.

7. A process for the conversion of 2-ethylnaphthalene to 2-vinyldecahydronaphthalene which comprises heating said ethylnaphthalene at a temperature of from about 75° C. to about 135° C. in contact with air and sodium cumene hydroperoxide and forming 2-ethylnaphthalene hydroperoxide, heating said 2-ethylnaphthalene hydroperoxide at a temperature of from about 25° C. to about 200° C. in contact with hydrogen and nickel kieselguhr catalyst and forming naphthylmethyl carbinol, heating said naphthylmethyl carbinol at a temperature of from about 125° C. to about 200° C. in contact with iodine and forming 2-vinyldecahydronaphthalene.

References Cited by the Examiner

UNITED STATES PATENTS

| | | | |
|---|---|---|---|
| 2,345,625 | 4/1944 | Palmer et al. | 260—682 |
| 2,422,802 | 6/1947 | Schelling et al. | 260—681 |
| 3,096,376 | 7/1963 | Clement et al. | 260—666 |

OTHER REFERENCES

E. Earl Royals: Advanced Organic Chemistry; reprint, Prentice-Hall, 1956, pp. 338–9.

Faraday Encyclopedia Hydrocarbon Compounds, $C_8H_{6-14}$, volume 3A Chemindex Ltd., copyright 1953.

DELBERT E. GANTZ, *Primary Examiner.*

V. O. O'KEEFE, *Examiner.*